United States Patent

[11] 3,604,247

[72] Inventors Philippe Gramain;
　　Roger Libeyre, both of Strasbourg, France
[21] Appl. No. 843,116
[22] Filed July 18, 1969
[45] Patented Sept. 14, 1971
[73] Assignee Agence Nationale De Valorisation De La Recherche (Anvar)
　　Puteaux, France
[32] Priority July 19, 1968, Feb. 26, 1969
[33] France
[31] 159,951 and 6,904,967

[54] AUTOMATIC VISCOSITY METER
6 Claims, 4 Drawing Figs.
[52] U.S. Cl. ....................................................... 73/55
[51] Int. Cl. ....................................................... G01n 11/06
[50] Field of Search............................................ 73/55, 54, 293, 432 PD

[56] References Cited
UNITED STATES PATENTS
2,208,444　7/1940　Bailey............................ 73/55 X
3,071,961　1/1963　Heigl et al..................... 73/55

FOREIGN PATENTS
1,528,728　6/1968　France ......................... 73/55

OTHER REFERENCES
Jones, G. et al. The Automatic Timing of the Ostwald Viscometer by Means of a Photoelectric Cell. In Journal of Physics, Vol. 4: p. 215-224, June 1933

Primary Examiner—Louis R. Prince
Assistant Examiner—Joseph W. Roskos
Attorney—Stevens, Davis, Miller & Mosher ABSTRACT: The automatic viscosity meter comprises a vertical tube in which flows the liquid whose viscosity is to be measured. This tube is maintained at a constant temperature by a thermostatically controlled liquid. The viscosity measurement is obtained by measuring the time taken by a given volume of liquid contained in the tube to flow between two points. The reading of the passage of the meniscus past these two points is made automatically by using luminous sources and only a single-receiving element, with the interposition of a prism or mirrors.

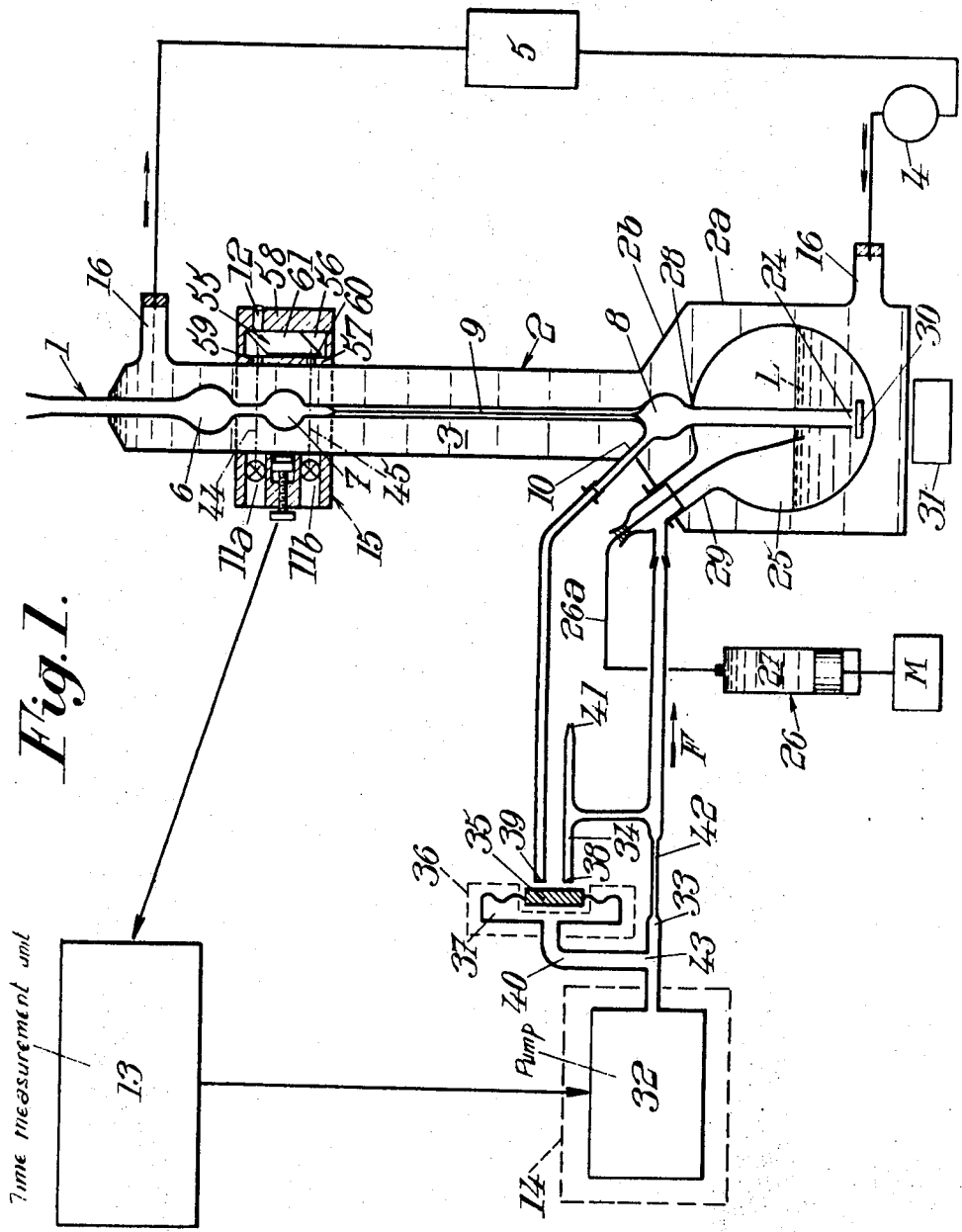

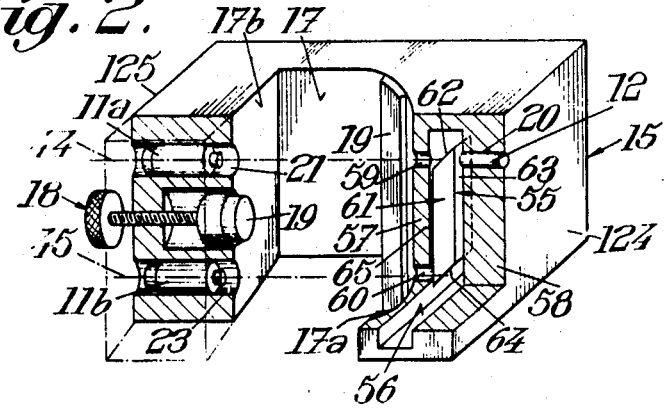
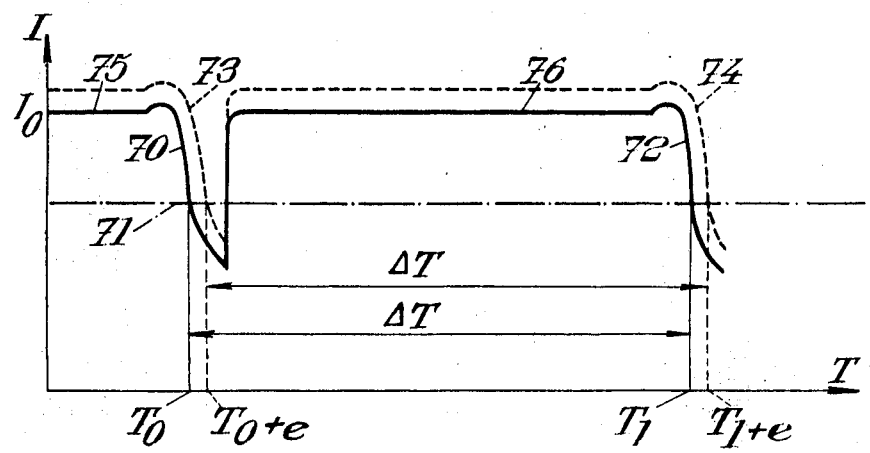
INVENTORS
PHILIPPE GRAMAIN
ROGER LIBEYRE

INVENTORS
**PHILIPPE GRAMAIN
ROGER LIBEYRE**

3,604,247

AUTOMATIC VISCOSITY METER

The invention relates to automatic viscosity meters of the type comprising a transparent measurement tube, one portion of which has a relatively reduced internal section, through which portion a liquid to be studied flows from end to end, at substantially constant pressure differential, a transparent jacket surrounding the measurement tube and adapted for a transparent thermal regulation liquid to flow through it, a reading device comprising sources of radiation and receiving means sensitive to the radiations of the sources and adapted to read off at a given points the passage of the meniscus of the liquid to be studied, means for measuring the passage time of the meniscus between the said points, and means for filling the measurement tube with the liquid which is to be studied.

The invention relates more particularly, but not exclusively, to the viscosity meters of the above type which are intended for the measurement of the intrinsic viscosity of polymers.

An important aim of the invention is to improve the accuracy and reproduceability of viscosity measurements carried out with apparatus of this type.

Another aim of the invention is to simplify the use of such apparatus and at the same time to improve their efficiency and their output.

In accordance with the invention, an automatic viscosity meter of the type defined above is characterized by the fact that the jacket is closed and of generally elongated cylindrical shape, that the reading device is arranged in the form of an easily interchangeable hollow block, that the receiving means of the reading device comprise a single element sensitive to the radiations from the sources and that the reading device comprises means adapted to cause the radiation from each of the sources to fall on the said sensitive element.

The invention, in any case, will be easily comprehended with the aid of the description which follows, and the accompanying drawings, these all being relative to a preferred embodiment, and not at all restrictive.

In the drawings:

FIG. 1 is a diagrammatic general section of an automatic viscosity meter set up in accordance with the invention;

FIG. 2 shows in perspective, with portions removed, a reading device block of the viscosity meter;

FIG. 4 shows diagrammatically the variations in intensity of the current passing through the single-sensitive element of the receiving means, as a function of time.

Figure 3:
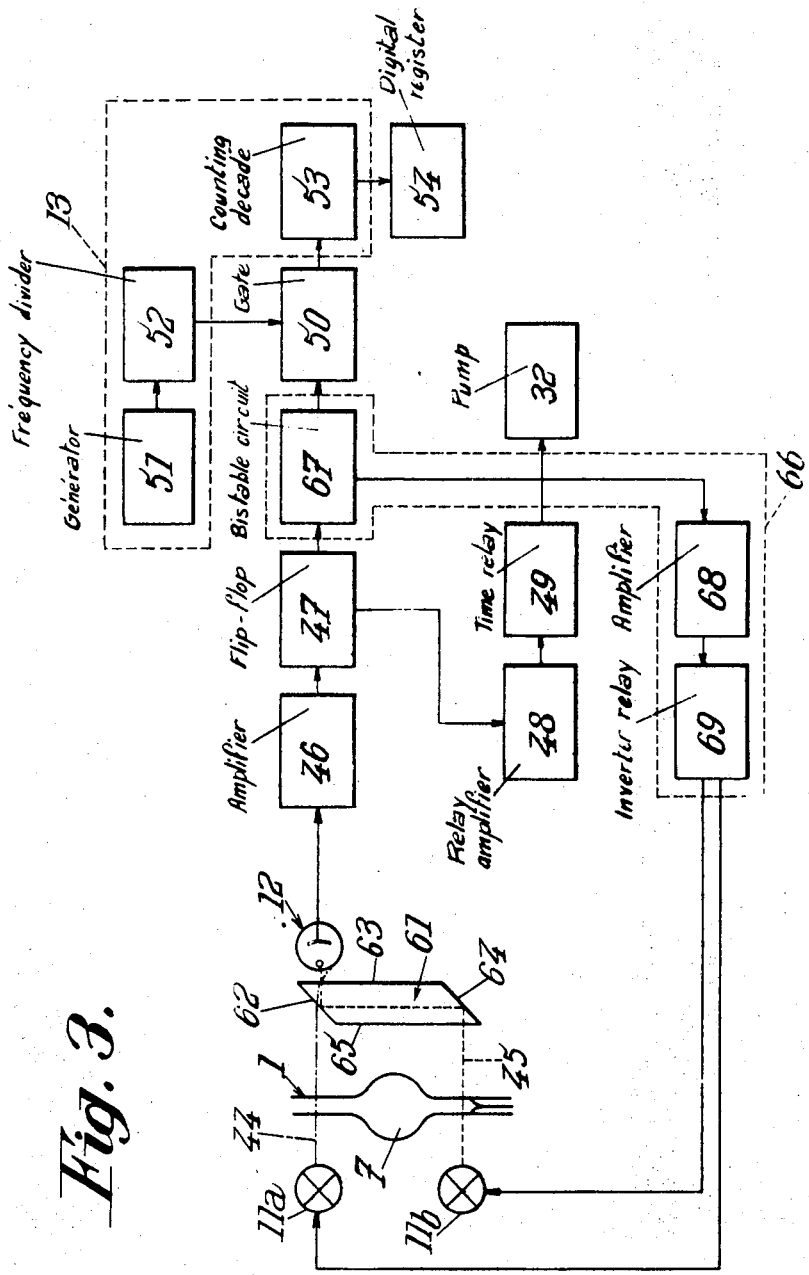
FIG. 3 shows diagrammatically the various electric or electronic circuits.

Before beginning the description itself, it should be pointed out that the adjective "transparent" is used in the sense of applying the property of substantially freely passing the source radiations of the reading device.

As far as concerns the viscosity meter as a whole, it is comprised of a measurement tube or viscosity meter tube 1, which is substantially vertical, a jacket 2 surrounding this tube, and in which circulates a transparent liquid 3, generally water, for maintaining the tube 1 at a constant temperature. The liquid 3 is set into movement by means of a pump 4 and passes into a thermal regulation unit 5 which may comprise heating and cooling elements.

The transparent viscosity meter tube, which is frequently made of glass, comprises generally two bulbs at its upper portion, one guard bulb 6, and slightly below it a bulb 7, the volume of which substantially determines the volume of liquid to be studied. This bulb 7 is connected to a lower bulb 8 by a capillary tube 9, constituting the portion of the tube 1 of reduced internal section. A channel 10, passing from the upper portion of the bulb 8, passes through the jacket 2 in the upward direction. This channel serves in particular for venting the bulb 8 to the outside air. When the bulb 7 is filled with liquid L to be studied and the bulb 8 is put under atmospheric pressure, which pressure also prevails above the liquid to be studied contained in the bulb 7, the said liquid flows from the bulb 7 into the bulb 8 under a substantially constant pressure which is equal to the average head of liquid between the bulbs 7 and 8. The liquid L moreover does not remain in the bulb 8 but is withdrawn towards the lower portions of the tube 1, which tube, outside the capillary zone 9, has an internal diameter clearly greater than that of the said capillary zone.

A reading device located at the level of the bulb 7, preferably externally to the jacket 2, although it can also be placed in the interior of the said jacket and accordingly bathed by the liquid 3, enables the passage of the meniscus to be read at the entry and at the outlet of this bulb. The device comprises two radiation sources 11a and 11b which may emit advantageously an electromagnetic radiation, generally visible, ultraviolet or possible infrared.

In what follows, these sources will be designated generally as "luminous sources" and the beam which they emit, as "luminous beam" though it should be understood that the adjective "luminous" and the term "light" are not restricted to the visible spectrum. The sources 11a and 11b are arranged in such a manner that the luminous beams 44 and 45 which they emit respectively and which have been shown diagrammatically in broken lines, pass through the tube 1 perpendicularly to its axis and substantially at the level of the upper and lower limits of the bulb 7. The reading device also includes light-receiving means on which the luminous beams 44, 45 fall after having passed through the tube 1.

As is known, a device of this type functions in the following manner: the liquid will be assumed to be transparent.

When the tube 1 is empty at the level of one of the beams, 44 or 45, the amount of light from the beam considered, which falls on the light-receiving means, is relatively weak. When the tube 1 contains liquid to the level of either of the beams 44 or 45, the amount of light corresponding to the beam considered, which falls on the light-receiving means, is much stronger. When the meniscus of the liquid contained in the tube 1 crosses one of the beams 44 or 45, a variation in the luminous flow received by the light-receiving means takes place, which is translated into the form of an electric signal which is easily utilizable for starting or stopping a time measurement unit 13, to measure the interval of time separating the passages of the meniscus as it descends through the upper beam 44 and through the lower beam 45.

If the liquid L was opaque to the source radiations 11a and 11b, the automatic measurements could nevertheless be carried out by the crossing of one of the beams 44 or 45 by the meniscus accompanied by a variation in flow of light in a direction contrary to that of the variation obtained with a transparent liquid.

Hitherto, the receiving means comprised several light sensitive elements, preferably two, corresponding respectively to the beams 44 and 45. A specific light sensitive element, such as a photodiode was accordingly associated with each luminous beam. If the measurements are to be accurate and easily reproducible, it is important for the sensitive elements to have and to keep identical characteristics by which they are able to respond by an identical signal to the same variation in the intensity of the light. More detailed reasons for these requirements will be supplied below. In actual practice it is very difficult to find two sensitive elements which fulfill these conditions, since each sensitive element ages differently, in particular as a function of time and temperature.

To overcome this disadvantage, the automatic viscosity meter in accordance with the invention is characterized by the fact that the receiving means of the reading device comprise a single element 12 sensitive to the source radiations 11a and 11b, and that the reading device comprises means 55 which are adapted to cause the rays emitted by both the sources 11a and 11b to fall on the said sensitive element 12.

A generally elongated cylindrical shape is used for the jacket 2 and the reading device is arranged in the form of a hollow block 15 (FIG. 2) which can easily be exchanged. This block 15 is arranged outside the jacket 2 which it surrounds, in a manner such that the beams 44, 45 emitted by the sources 11a, 11b fall on the sensitive element 12 after having passed through the jacket 2, the liquid 3, the tube 1, possibly the liquid to be studied, and again the tube 1, the liquid 3 and the jacket 2.

The jacket 2 is constituted generally of an elongated, circular cylindrical glass tube. In actual fact it is not essential for the jacket 2 to be constituted entirely of transparent material, and it suffices if transparent windows are provided for the passage of the luminous beams, the body of the jacket being of metal, for instance. Connecting pieces 16 are welded to the ends of the jacket 2 to facilitate the attachment of the said jacket to the regulating liquid circuit. The tube 1 is advantageously welded to this jacket in such a manner that a unit ready to be used is obtained.

The block 15 may have the shape of a rectangular parallelepiped, as shown in FIG. 2, in which a cylindrical or prismatic cavity 17 has been made, having generatrices perpendicular to two parallel faces of the block. This cavity 17, as may be seen in FIG. 2, gives the block 15 the appearance of a substantially J-shaped hook. In this manner, the block 15 may be engaged round the jacket 2 by a translation in a direction perpendicular to the generatrices of the jacket, and the generatrices of the bent portion 17a of the cavity 17 may be applied against those of the jacket 2, the said bent portion following closely the shape of the jacket. The fastening of the block 15 on the jacket 2 at the level of the bulb 7 is obtained by means of a pressure screw 18. At the end of the screw 18 and on the bent portion 17a of the cavity it is advantageous to provide stop members 19 of flexible material such as rubber or cork, to avoid direct contact of the block 15, which is generally made of duralumin, chromiumed brass or stainless steel, and the jacket 2, which is generally made of glass. Vertically aligned cylindrical housings 21 and 23, adapted to receive respectively the luminous sources 11a and 11b, are pierced in the block 15 and open out on the face 17b. The axes of the housings 21 and 23 are perpendicular to two faces 124 and 125 of the block 15, which faces are not notched by the cavity 17. The two axes are furthermore located in a plane which is parallel to the generatrices of the cavity 17 and they are separated by a spacing which is substantially equal to the height of the bulb 7, the housing 21 being located above the housing 23. The luminous sources 11a and 11b may be constituted of small electric light bulbs having at their end hemispherical lenses adapted to concentrate the luminous beams 44 and 45. These bulbs are supplied with current from a stabilized constant voltage source, which is not illustrated.

A cylindrical housing 20, located with its axis on the extension of the axis of the housing 21 is provided in the portion of the block 15 opposite the housings 21 and 23 and limited by the face 124. This cylindrical housing 20 opens out on the one hand on the face 124 and on the other hand in a cavity 56 in the interior of the block 15 between the bent portions 17a and the face 124. The light sensitive element 12, for instance a photodiode, is arranged in this housing 20, and means 55 is provided for guiding the beams to it.

The cavity 56 of parallelepiped form extends substantially over the entire height of the block 15 and opens out on the front face of the block, as shown in FIG. 2. This cavity is separated from the bent portion 17a by a wall 57 of small thickness, and from the face 124 by a thicker wall 58. Two cylindrical holes 59 and 60 are pierced in the wall 57 with their axes on the extension of the axes on the housings 21 and 23 respectively. A removable cover, which is not shown, is provided for closing the cavity 56 at its front face.

The means 55 are advantageously constituted of a prism 61, made of glass or plexiglass if the radiation of the sources 11a and 11b is located in the visible spectrum, or made of quartz if the radiation is located in the near ultraviolet zone. The prism 61 is arranged in the cavity 56. The prism 61 has parallelepiped shape the four faces 62, 63, 64 and 65 each having the shape of a rectangle, and the other two faces having the shape of a parallelogram. The parallel faces 62 and 64 are inclined through 45° in relation to the parallel faces 63 and 65.

The prism is positioned so that the faces 63 and 65 are parallel to the faces 124 and 125 of the block 15, the face 62 is located at the level of the hole 59 and turned towards this hole, and the intersection of the faces 62 and 63 is normal to the direction of the generatrices of the cavity 17. The prism is of such length that the lower end of the face 64 goes beyond the hole 60. In this manner, the faces 62 and 64 are inclined through 45° in relation to the beams 44 and 45. The portion of the beam 44 which passes through the prism 61 will be deflected by the latter but will nevertheless fall on the light sensitive element 12, as can be seen in FIG. 3, which element 12 is very close to the face 63 of the prism and which generally has a small lens playing the role of condenser. A portion of the beam 45 will suffer two deflections, with change of direction through 90°, in relation to the faces 64 and 62 of the prism, before falling on the light sensitive element 12.

To avoid deflection of the beam 44, which is not inconvenient in practice, it would be possible to stick on the face 62 of the prism 61 a complementary prism of rectangular isosceles triangular cross section, the hypotenuse of which would be located in the plane of the face 62, and one of the faces of which would be in the plane of the face 65 of the prism 61. The beam 44 arriving normally (or perpendicularly) on the face of the complementary prism located in the plane of the face 65, would enter the said prism without being deflected. The contact face 62 would be previously treated in such a manner that it would behave as a semitransparent mirror. It could also be metallized, with the exception of its central portion, which would remain clear. Thus, the beam 44 would pass without deflection through this central portion, and arriving perpendicularly on the face 63, would issue from the prism 61 without being deflected.

Instead of the prism 61 it would be possible to use a semitransparent mirror associated with a total reflection mirror, the former replacing the face 62 of the prism, the latter the face 64 of the prism. It would also be possible to use optical fibers, which, like the optical devices envisaged above, would enable the light emitted by the sources 11a and 11b to be directed onto the light sensitive element 12.

Advantageously a device 66 is provided by which it is possible to black out one of the beams 44, 45 in such a manner that the light sensitive element 12 has light falling on it only from one luminous source at a time.

This device 66 (FIG. 3) has in particular a bistable circuit 67 which can change from a first stable state to a second stable state and vice versa under the influence of signals issued by the light sensitive element 12, amplified by an amplifier 46 (FIG. 3) and shaped by a Schmitt flip-flop 47. The bistable circuit 67 is connected to an amplifier 68 and to an inverter relay 69. The triggering of the circuit 67 engenders the signal, which, amplified by the amplifier 68, brings about the triggering of the inverter relay 69 between a stable state in which the source 11a is alight and the source 11b is extinguished, and another stable state in which the source 11a is extinguished, and the source 11b is alight, or vice versa.

The bistable circuit 67 is set up in a manner so that it triggers only when the meniscus of the liquid of the tube 1 crosses the beam 44 or the beam 45 as it descends; the same is true of the triggering of the inverter relay 69 and it is only on the descent of the meniscus that this relay functions.

More specifically, as far as concerns the tube 1 it is advantageous for its lower end 24 (FIG. 1) to open out into a receptacle 25 containing a quantity of the liquid L to be studied, in such a manner that the said end is immersed in the said liquid. Means 14 for filling the tube 1 with liquid are arranged so as to be able to exert in the receptacle 25 excess pressure suitable to cause the liquid L to pass from the receptacle 25 to the tube 1. The receptacle 25 is connected to an automatic burette 26, adapted to change the composition of the liquid L of the receptacle 25 by introducing predetermined volumes of an auxiliary liquid 27.

The receptacle 25, preferably a flask, may be welded at 28 to the tube 1, slightly below the bulb 8. The receptacle 25 has at its upper portion a connecting piece 29 by which it is possible to connect the said receptacle to the automatic burette 26 and to the filling means 14. A magnetic stirrer 30 is provided in the bottom of the receptacle for stirring and making homogeneous the liquid to be studied. The magnetic stirrer 30 is set in movement by a rotating magnet unit 31.

The automatic burette 26, shown diagrammatically in FIG. 1, has a cylinder and a piston moved by a motor M, an injection channel 26a immersing in the receptacle 25. By means of this burette, it is possible to inject into the receptacle 25 automatically, predetermined quantities of auxiliary liquid 27, for instance a solvent of the liquid L. This burette may if desired be used for introducing the liquid L initially into the receptacle 25.

In accordance with a preferred embodiment, the circular cylindrical jacket 2 is extended by a portion 2a of larger diameter, surrounding the receptacle 25. The connection between the upper portion of the jacket 2 and the portion 2a is ensured by a truncated con 2b. The liquid L to be studied is thus kept at the same uniform temperature in the receptacle 25 and in the tube 1, by virtue of the thermal regulating fluid in which the tube 1, and the receptacle 25 are totally immersed.

With such a device, measurement of viscosity in particular with variable concentrations, become very simple and very rapid, the use of a single measurement tube 1 necessitating only one calibration of a reference point, contrary to the case with apparatus where several tubes are used.

The automatic viscosity meter may moreover comprise a pump 32, for instance an air pump, provided with a delivery conduit 33, connected to the receptacle 25, a channel 34 for communication with the ambient atmosphere being connected to the conduit 33. It may be noted that the air pump 32, the function of which is to increase the pressure in the receptacle 25, may be replaced by a cylinder of compressed gas, which is not shown, in particular of nitrogen when it is necessary to avoid the presence of air above the liquid L.

A common obturation member 35 is then provided for the two channels 34 and 10 for communication with the ambient atmosphere, the said obturation member 35 being controlled by means 36 which are sensitive to the pressure in the delivery conduit 33 of the pump, in such a manner that the opening of the two channels 34 and 10 is controlled automatically by the stopping of the pump.

The means 36 are preferably constituted of a deformable capsule 37, for instance of rubber, carrying the obturation member 35, such as a rubber pellet.

This member 35 is located in front of the ends, 38 and 39 respectively, of the channel 34 and of the extended channel 10, in such a manner that a swelling of the capsule 37 applies the member 35 against the ends 38 and 39 to obturate them. This swelling is obtained, when the pump is set in operation, by the increase of pressure in the delivery conduit 33 connected to the capsule 37 by the channel 40. When the pump 32 stops, a very small leak 41 provided in the conduit 33 enables a pressure drop to take place in this channel and the deflation of the capsule 37.

In the preferred embodiment, the delivery conduit 33 has a throttle 42 located between the connection 43 of the capsule 37 to the outlet of the pump 32 and the receptacle 25.

The apparatus functions as follows: to take an example, suppose that one is studying the relative variation in viscosity of a solution of a substance A in the solvent 27 as a function of the concentration of the solution. It is known that the flow time of a given volume of liquid in a tube, other things being equal, is proportional to the viscosity of the liquid. For relative measurements to be taken, it accordingly suffices to study the relative variations of flow time. For an absolute measurement, one would make a preliminary study of the flow time of a liquid of known viscosity such as water. One is considering the beginning of a measurement of viscosity for which the upper source 11a is alight and the source 11b is extinguished.

Initially, a known amount of the most concentrated solution of the substance A is introduced into the receptacle 25 in the solvent 27, in a sufficient amount for the lower end 24 of the tube 1 to dip into the solution. Then the air pump 32 is started. The air is circulated in the tube 33 following the arrow F. As a result of the pressure loss created by the throttle 42, the pressure upstream of the throttling 42 increases sufficiently to swell the capsule 37 and the pellet 35 obturates the ends 38 and 39. The slight air leak at 41 does not prevent the pressure in the receptacle 25 from increasing. The liquid in the receptacle rises in the tube 1 under the influence of this pressure, reaches the bulb 8, penetrates into the channel 10, imprisoning in this channel a cushion of air which cannot escape, since the end 39 of this channel is obturated by the pellet 35. The progress of the solution in the arm or channel 10 is rapidly blocked by the rise in pressure of the imprisoned air. On the other hand, the liquid continues to rise in the tube 1 and reaches the bulb 7.

The meniscus as it rises crosses the single beam 44, since the source 11b is extinguished. The crossing of the beam 44 is revealed in a variation of the luminous flow received by the light sensitive element 12, which supplies a signal which after amplification by the amplifier 46 and shaping by the Schmitt flip-flop 47, brings about the delayed stopping of the air pump by means of a relay amplifier 48 and a time relay 49 (FIG. 3).

Some moments after the crossing of the beam 44, the pump 32 stops, the leak 41 causes the pressure in the interior of the capsule 37 to drop. The pellet 35 removes itself from the ends 38 and 39, which brings about a rapid connecting to the atmosphere of the receptacle 25 and the bulb 8, by the channels 34 and 10 respectively, of larger diameter than that of the leak 41.

The liquid which has risen in the tube 1 begins to descend again. Since the internal diameter of the lower portion 24 of the tube 1 is greater than that of the capillary tube 9, the bulb 8 empties itself into the receptacle 25 more rapidly than it is filled by the supply of liquid from the bulb 7. The liquid will accordingly flow between the bulbs 7 and 8 under a pressure which is substantially constant and equal to the average height of liquid between the bulbs 7 and 8, since these bulbs are at atmospheric pressure.

The meniscus again passes, but this time in a descending direction, in front of the beam 44. A signal 70 (FIG. 4) is produced by the light sensitive element 12 through which a current passes, the intensity I of which is decreasing.

At the moment $T_0$ (FIG. 4) when the intensity I crosses a predetermined threshold 71, the Schmitt flip-flop 47 (FIG. 3) produces a signal which controls the triggering of the bistable circuit 67 (FIG. 3), and by this fact, as explained above, the extinction of the source 11a and the lighting of 11b. The triggering of the bistable circuit 67 also controls the opening of a gate 50 (FIG. 3) which permits a quarts generator 51, for instance of 2,000 cycles per second, to connect up, by means of a frequency divider 52 dividing the frequency of the generator by two, a counting decade 53 for a time measurement. Since the extinction and the lighting of the sources 11a and 11b are not instantaneous, a certain time elapses between the moment $T_0$ and the moment when the intensity I regains a substantially constant value corresponding to the luminous flow or flux issuing from the source 11b. This value $I_0$ is equal to that of the intensity I before the appearance of the signal 70, or substantially equal to it, through a regulating explained below. The generator 51, the frequency divider 52 and the counting decade 53 constitute the time measurement unit 13.

The liquid continues to descend and the meniscus crosses the beam 45. A signal 72 (FIG. 4), analogous to the signal 70, produced by the light sensitive element 12, controls at the moment $T_1$ of crossing of the threshold 71 on the one hand the closing of the gate 50 and the stopping of the counting decade 53, and on the other hand the extinction of the source 11b and the lighting of the source 11a; and furthermore, after a delay which can be regulated, controls the putting into operation of the air pump 32 to cause the liquid to rise up again in the tube for a fresh measurement to be made. The time measurement of the counting decade gives a result equal to the difference $\Delta T = T_1 - T_0$. It is possible to provide for a recording of the results on a digital register 54 (FIG. 3) and to carry out a predetermined number of automatic measurements for a given concentration.

Then an order is transmitted to the automatic burette, filled with solvent 27, for the injection of a certain amount of solvent corresponding to the second concentration to be studied.

The stirrer 30 is put into operation, and the liquid may be caused to rise and fall several times in the tube 1 without measurement of the passage time, to carry out complete cleaning of this tube and perfect homogenization of the mixture. In actual fact droplets of the previous solution could remain attached to the walls of the tube 1, and their presence would falsify the first few measurements bearing on the new concentration.

When the dilution has been carried out and the homogenization obtained, a series of measurements analogous to the above are carried out on the fresh solution.

When this second series of measurements has been completed, a third is started up in the apparatus, in accordance with the program drawn up, until the program has been completed.

In the example envisaged, a series of measurements of viscosity were carried out on decreasing concentrations of solutions of the substance A in the solvent 27. Of course it would be possible to proceed in the reverse manner, and to treat increasing concentrations by arranging initially in the receptacle 25 at least concentrated solution of the substance A, and by filling the burette 26 with the substance A.

Advantageously, a regulable delay between the control signals and the stopping or starting the pump 32, may be introduced by means of the time regulable relay 49.

The delay between the control signal for stopping the pump and the actual stopping of the pump is necessary to allow the liquid to cross the beam 44 as it rises, in such a manner that on the descent, at the moment when the meniscus again crosses this beam 44 the flow system is well established.

The delay between the control signal for starting the pump and the starting of the pump should be sufficient to allow, on descent, all the liquid contained in the capillary tube 9 to flow, as if this is not the case, the fraction of liquid rising again imprisons air bubbles into the capillary tube, which may be difficult to eliminate and may bring about premature triggering of the element 12.

Moreover, if in spite of everything, some bubbles form at this moment, they give an electric signal to the element 12, but because of the delay in control of the pump relay, this signal does not have immediate effect on the functioning of the pump, which continues to cause the liquid to rise up and the bubble disappear by themselves.

With the automatic viscosity meter produced in this way, it is possible to obtain a very high accuracy of measurement, and very good reproduceability results.

In actual fact, if the characteristics of the light sensitive element 12 vary, on the one hand the signal 70 will be changed and will become a signal 73 shown in dashes in FIG. 4, and on the other hand, the signal 72 will be changed in the same way as the signal 70, and will give a signal 74. As the triggering threshold was not effected, one sees that the moments of starting and ending counting, $T_0$ and $T_1$ become respectively $T_0+e$ and $T_1+e$ in such a manner that the difference $(T_1+e)-(T_0+e)$ will remain equal to $\Delta T + T_1 - T_0$. The result of the measurement, $\Delta T$, will not accordingly be affected by the variations of characteristics of the single-light sensitive element 12. The accuracy of the measurement is not accordingly effected by the variations in characteristics of the element 12.

It will be noted that before carrying out a series of measurements, care is taken to adjust the levels 75 and 76 (FIG. 4) to the same ordinate $T_0$ by acting for instance on potentiometers for regulating the supply of the sources 11a and 11b. By this fact, the possible variations of characteristics of the light sources are eliminated.

Moreover, the apparatus realized is entirely automatic, very sure in operation and very flexible and enables measurements to be made easily and rapidly on solutions of various concentrations, directly prepared in the apparatus. The construction of such apparatus is inexpensive.

It may also be noted that the preferred embodiment has all the advantages inherent in the arrangement of the reading block 15 on the outside of the jacket 2. It is accordingly possible to carry out measurements of viscosity at fairly high temperatures, since one is not restricted by the maximum functioning temperature (approximately 80° C.–100° C.) of the element 12, such as photodiodes. In actual fact, this element is placed at the surrounding air temperature and not at the temperature of the liquid of thermal regulation, as in the case of an arrangement inside the jacket 2. Moreover, there are no problems as regard sealing posed by the immersion of the reading block in the liquid of the jacket.

In accordance with a variation, instead of blacking out one of the beams 44 or 45, it would be possible, by means of rapid cuts of the two beams as a function of time (pulsing), to code the two beams differently. One would then be able to receive the two beams simultaneously on the same light sensitive element 12, with subsequent decoding of the total signals supplied by the light sensitive element 12 in such a manner as to identify the component due to the beam 44 and that due to the beam 45. It accordingly becomes possible to follow the variations in light intensity of these beams separately at the outlet of the tube 1, and to deduce therefrom the level of the meniscus in the tube.

In accordance with another variation, instead of lacking out one of the beams 44 or 45 by the extinction of the corresponding source, one could for instance, by means of the relay 69 control a shutter adapted to intercept one or other of the beams, without extinguishing the sources 11a and 11b, which in this case would be able to be reduced to a single actual source 11a for instance, the single beam of which would be divided into two beams 44 and 45 by means of an optical device such as glass prism or mirrors. One may then consider that the beam 45 arrives from a virtual source 11b which would be the image formed by the optical device of the real source 11a.

In accordance with another variation, one could gather permanently the total flux or flow issuing from the sources 11a and 11b, and follow the variations in this total flow, both the sources 11a and 11b being real, or one real and one virtual.

Of course, and as can be seen moreover from the above, the invention is by no means restricted to the methods of application which have been specially indicated and this applies also to the methods of realization of its various parts; the invention on the contrary, covers all the variations.

We claim:

1. Automatic viscosity meter comprising a transparent measurement tube, one portion of which has a relatively reduced internal section, between the ends of which portion a liquid to be studied flows under a substantially constant pressure differential; a closed transparent jacket of generally elongated cylindrical shape surrounding the measurement tube and adapted to have flowing through it a transparent thermal regulating liquid; a reading device arranged in the form of an easily interchangeable hollow block comprising radiation sources, receiving means comprising a single element sensitive to the radiations of the sources and means to cause the radiations of each of the sources to fall on said sensitive element, said reading device being adapted to read the passage, at given points, of the meniscus of the liquid located in the measurement tube for a viscosity measurement to be made; means for measuring the passage time of the meniscus between the said points; and means for filling the measurement tube with liquid to be studied; said hollow block being arranged on the outside of the said jacket which it surrounds in such a manner that the radiations emitted by the sources fall on the receiving means of the reading device after having passed through the jacket, the thermal-regulating liquid, the measurement tube, and the liquid to be studied if this liquid has reached the level of these radiations, and again, the measurement tube, the thermal regulating liquid and the jacket.

2. Automatic viscosity meter in accordance with claim 1, in which the means for causing the radiation of the sources to fall on the single-light sensitive element are constituted by a prism of glass, plexiglass or quartz.

3. Automatic viscosity meter in accordance with claim 1, in which the sources of radiation are real and are constituted by two electric bulbs arranged one under the other, said automatic viscosity meter further comprising a device for extinguishing the upper source, initially lighted, and for lighting the lower source initially extinguished, when the meniscus of the liquid contained in the tube passes at it descends in front of the upper source and for extinguishing the lower source and lighting the upper source when the meniscus, continuing its descent, passes in front of the lower source, the device not having any action when the meniscus rises.

4. Automatic viscosity meter in accordance with claim 1, in which the block of the reading device is held by a pressure screw.

5. Automatic viscosity meter in accordance with claim 1, comprising an automatic burette connected to the receptacle into which the tube dips, enabling dilutions or concentrations automatically.

6. Automatic viscosity meter comprising a transparent measurement tube, one portion of which has a relatively reduced internal section, between the ends of which portion a liquid to be studied flows under a substantially constant pressure differential; a transparent jacket surrounding this measurement tube and adapted to have flowing through it a transparent thermal regulating liquid; a reading device comprising radiation sources, and receiving means sensitive to the radiations of the sources and adapted to read the passage, at given points, of the meniscus of the liquid located in the measurement tube for a viscosity measurement to be made; means for measuring the passage time of the meniscus between said points; and means for filling the measurement tube with liquid to be studied; said automatic viscosity meter further comprising a receptacle into which the measurement tube opens; and in which automatic viscosity meter the means for filling the measurement tube comprise in combination a pump the delivery conduit of which is connected to the receptacle, a first channel for communicating with the ambient atmosphere connected to the delivery conduit and a second channel for communication with the ambient atmosphere connected to the measurement tube between the portion of reduced section and the portion dipping into the receptacle, an obturating member common for the two channels for communicating with the ambient atmosphere, controlled by means which are sensitive to the pressure in the delivery conduit of the pump, with the result that the opening of the two channels is controlled automatically by the stopping of the pump.